(12) United States Patent
Klokkersund

(10) Patent No.: US 11,553,700 B2
(45) Date of Patent: Jan. 17, 2023

(54) KING CRAB OR FISH POT

(71) Applicant: Mørenot Fishery AS, Søvik (NO)

(72) Inventor: Hallvard Klokkersund, Alesund (NO)

(73) Assignee: MØRENOT FISHERY AS, Ålesund (NO)

( * ) Notice: Subject to any disclaimer, the term of this patent is extended or adjusted under 35 U.S.C. 154(b) by 196 days.

(21) Appl. No.: 16/689,823

(22) Filed: Nov. 20, 2019

(65) Prior Publication Data

US 2021/0144980 A1    May 20, 2021

(51) Int. Cl.
*A01K 69/08*    (2006.01)

(52) U.S. Cl.
CPC ..................... *A01K 69/08* (2013.01)

(58) Field of Classification Search
CPC ......... A01K 69/06; A01K 69/08; A01K 69/10
USPC ............................................ 43/100, 102–105
See application file for complete search history.

(56) References Cited

U.S. PATENT DOCUMENTS

| | | | | |
|---|---|---|---|---|
| 34,887 A * | 4/1862 | Goodwin | ............... | A01K 69/06 43/102 |
| 439,991 A * | 11/1890 | Allison | ................. | A01M 23/08 43/100 |
| 475,845 A * | 5/1892 | Bolling | ................. | A01M 21/00 43/65 |
| 521,053 A * | 6/1894 | Seaton | .................. | A01M 21/00 43/65 |
| 693,391 A * | 2/1902 | Holland | ................. | A01K 69/06 43/100 |
| 872,556 A * | 12/1907 | Carwile | ................. | A01K 69/06 43/65 |
| 1,139,501 A * | 5/1915 | Dennis | .................. | A01M 21/00 43/65 |
| 1,167,732 A * | 1/1916 | Whelen | .................. | A01K 69/06 29/605 |
| 1,329,128 A * | 1/1920 | Mccaughan | ........... | A01K 69/06 43/100 |
| 1,474,087 A * | 11/1923 | Prime | .................... | A01M 23/18 43/66 |
| 1,607,443 A * | 11/1926 | Cormier | ................. | A01K 69/08 43/65 |
| 1,728,645 A * | 9/1929 | Ward | ..................... | A01K 69/08 43/100 |
| 2,516,658 A * | 7/1950 | Stelly | ..................... | A01K 69/08 43/100 |
| 2,731,761 A * | 1/1956 | Marshall | ................ | A01K 69/08 220/DIG. 25 |

(Continued)

FOREIGN PATENT DOCUMENTS

| | | | | | |
|---|---|---|---|---|---|
| CA | 1160450 A | * | 1/1984 | ............ | A01K 69/08 |
| CA | 1238554 A | * | 6/1988 | ............ | A01K 69/08 |

(Continued)

OTHER PUBLICATIONS

Search Report dated Apr. 17, 2020 in corresponding Norwegian Patent Application No. 20191380.

*Primary Examiner* — Darren W Ark
(74) *Attorney, Agent, or Firm* — Wenderoth, Lind & Ponack, L.L.P.

(57) ABSTRACT

A pot for catching crabs or fish has a lockable door adapted for unloading crabs or fish from the pot and a locking mechanism operable for locking and unlocking the door. The crab or fish pot has a frame structure defining a shape of the pot; a number of mesh panels attached to the frame structure; and at least one entrance for crabs or fish to enter the pot.

11 Claims, 4 Drawing Sheets

(56) References Cited

U.S. PATENT DOCUMENTS

| | | | | |
|---|---|---|---|---|
| 2,760,297 | A * | 8/1956 | Buyken | A01K 69/08 43/105 |
| 2,769,274 | A * | 11/1956 | Oglund | A01K 69/10 43/65 |
| 3,045,386 | A * | 7/1962 | Coyne | A01K 69/08 43/100 |
| 3,184,881 | A * | 5/1965 | Jantzeck | A01K 69/08 43/102 |
| 3,191,338 | A * | 6/1965 | Burgess | A01K 69/08 43/102 |
| 3,209,484 | A * | 10/1965 | Beamer | A01K 69/08 43/100 |
| 3,699,702 | A * | 10/1972 | Lankenau | A01K 69/08 43/100 |
| 3,708,905 | A * | 1/1973 | Jalbert | A01K 69/08 43/100 |
| 3,786,593 | A * | 1/1974 | Gerbrandt | A01K 69/10 43/100 |
| 3,795,073 | A * | 3/1974 | Olsen | A01K 69/10 43/100 |
| 3,821,861 | A * | 7/1974 | Jalbert | A01K 69/08 43/65 |
| 3,828,461 | A * | 8/1974 | Roberts | A01K 69/08 43/102 |
| 3,906,655 | A * | 9/1975 | Lowenthal, Jr. | A01K 69/08 43/100 |
| 3,919,803 | A * | 11/1975 | Manguso | A01K 97/20 43/55 |
| 4,030,232 | A * | 6/1977 | Niva | A01K 69/10 43/105 |
| 4,070,788 | A * | 1/1978 | Richcreek | A01K 69/08 43/100 |
| 4,156,984 | A * | 6/1979 | Kinser, Sr. | A01K 69/10 43/105 |
| 4,184,283 | A * | 1/1980 | Wyman | A01K 69/08 43/65 |
| 4,206,562 | A * | 6/1980 | Quevedo | A01K 69/08 43/102 |
| 4,221,071 | A * | 9/1980 | Sjolund | A01K 69/08 43/100 |
| 4,237,645 | A * | 12/1980 | Kinser | A01K 69/06 43/105 |
| 4,258,496 | A * | 3/1981 | Leone | A01K 69/08 43/102 |
| 4,509,288 | A * | 4/1985 | Shepherd | A01K 69/08 43/102 |
| 4,648,199 | A * | 3/1987 | Deaton | A01K 69/08 43/100 |
| 4,706,409 | A * | 11/1987 | Downing | A01K 69/08 43/100 |
| 4,765,089 | A * | 8/1988 | Rowe | A01K 69/06 43/105 |
| 4,864,770 | A * | 9/1989 | Serio | A01K 69/10 43/100 |
| 4,887,382 | A * | 12/1989 | Moritz | A01K 69/06 43/102 |
| 4,980,989 | A * | 1/1991 | Davis | A01K 69/06 43/100 |
| 5,168,653 | A * | 12/1992 | Wyman | A01K 69/06 43/100 |
| 5,218,781 | A * | 6/1993 | Miller | A01K 69/10 43/100 |
| 5,331,763 | A * | 7/1994 | Miller | A01K 69/10 43/100 |
| 5,357,708 | A * | 10/1994 | Peters | A01K 69/06 43/100 |
| 5,839,220 | A * | 11/1998 | Wass | A01K 69/10 43/104 |
| 5,946,850 | A * | 9/1999 | Sarkisyan | A01K 69/06 43/100 |
| 6,267,079 | B1 * | 7/2001 | Eby | A01K 61/60 119/226 |
| 6,804,911 | B1 * | 10/2004 | Henke | A01K 69/06 43/100 |
| 7,861,458 | B2 * | 1/2011 | Apps | B65D 11/1833 220/254.1 |
| 9,781,910 | B1 * | 10/2017 | Burrell | A01K 69/08 |
| 10,426,148 | B2 * | 10/2019 | Nguyen | A01M 23/18 |
| 10,499,621 | B1 * | 12/2019 | Gibson | A01K 69/10 |
| 11,369,097 | B2 * | 6/2022 | Brawn | A01M 23/16 |
| 2004/0181995 | A1 * | 9/2004 | Cheramie | A01K 69/10 43/105 |
| 2005/0229477 | A1 * | 10/2005 | Gomez | A01K 69/10 43/100 |
| 2006/0042065 | A1 * | 3/2006 | Matherne | A01K 69/06 29/428 |
| 2006/0112610 | A1 * | 6/2006 | Philbrook | A01K 69/10 43/100 |
| 2007/0186462 | A1 * | 8/2007 | Eichensehr | A01K 69/06 43/103 |
| 2007/0261292 | A1 * | 11/2007 | December | A01K 69/06 43/66 |
| 2009/0151226 | A1 * | 6/2009 | Apps | B65D 21/0212 43/100 |
| 2014/0305026 | A1 * | 10/2014 | Pemberton | A01K 69/06 43/100 |
| 2017/0172122 | A1 * | 6/2017 | Nguyen | A01K 69/06 |
| 2018/0139935 | A1 * | 5/2018 | Zheng | A01K 63/00 |
| 2018/0303077 | A1 * | 10/2018 | Dauphinee | A01K 69/08 |
| 2019/0343100 | A1 * | 11/2019 | Senf | A01K 69/08 |
| 2020/0015463 | A1 * | 1/2020 | Norburn | A01K 69/08 |
| 2021/0144981 | A1 * | 5/2021 | Klokkersund | A01K 69/10 |
| 2021/0169056 | A1 * | 6/2021 | Bendure | A01K 69/10 |

FOREIGN PATENT DOCUMENTS

| | | | | |
|---|---|---|---|---|
| CA | 3002094 A1 | * | 10/2018 | |
| FR | 1257787 A | * | 4/1961 | |
| GB | 1010224 A | * | 11/1965 | A01K 69/06 |
| GB | 2511271 B | * | 7/2016 | A01K 69/10 |
| KR | 200435353 Y1 | | 1/2007 | |
| KR | 100775966 B1 | * | 11/2007 | |
| KR | 20100000836 A | * | 1/2010 | |
| KR | 20100001581 U | * | 2/2010 | |
| KR | 20110001609 U | * | 2/2011 | |
| KR | 101104115 B1 | * | 1/2012 | |
| KR | 200465503 Y1 | * | 2/2013 | |
| KR | 20130019463 A | * | 2/2013 | |
| KR | 101338795 B1 | * | 12/2013 | |
| KR | 101355423 B1 | * | 1/2014 | |
| KR | 20150004992 A | * | 1/2015 | |

* cited by examiner

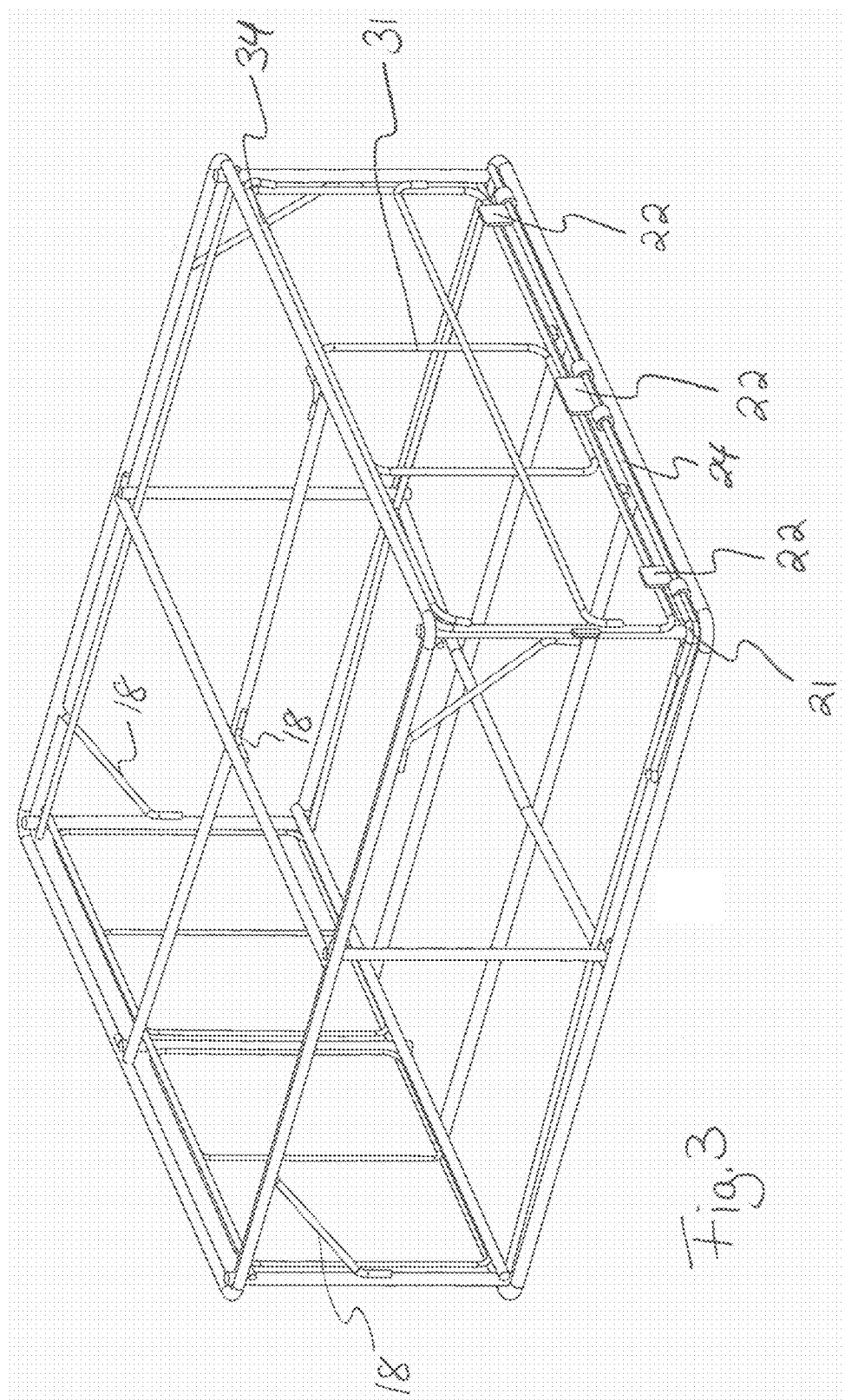

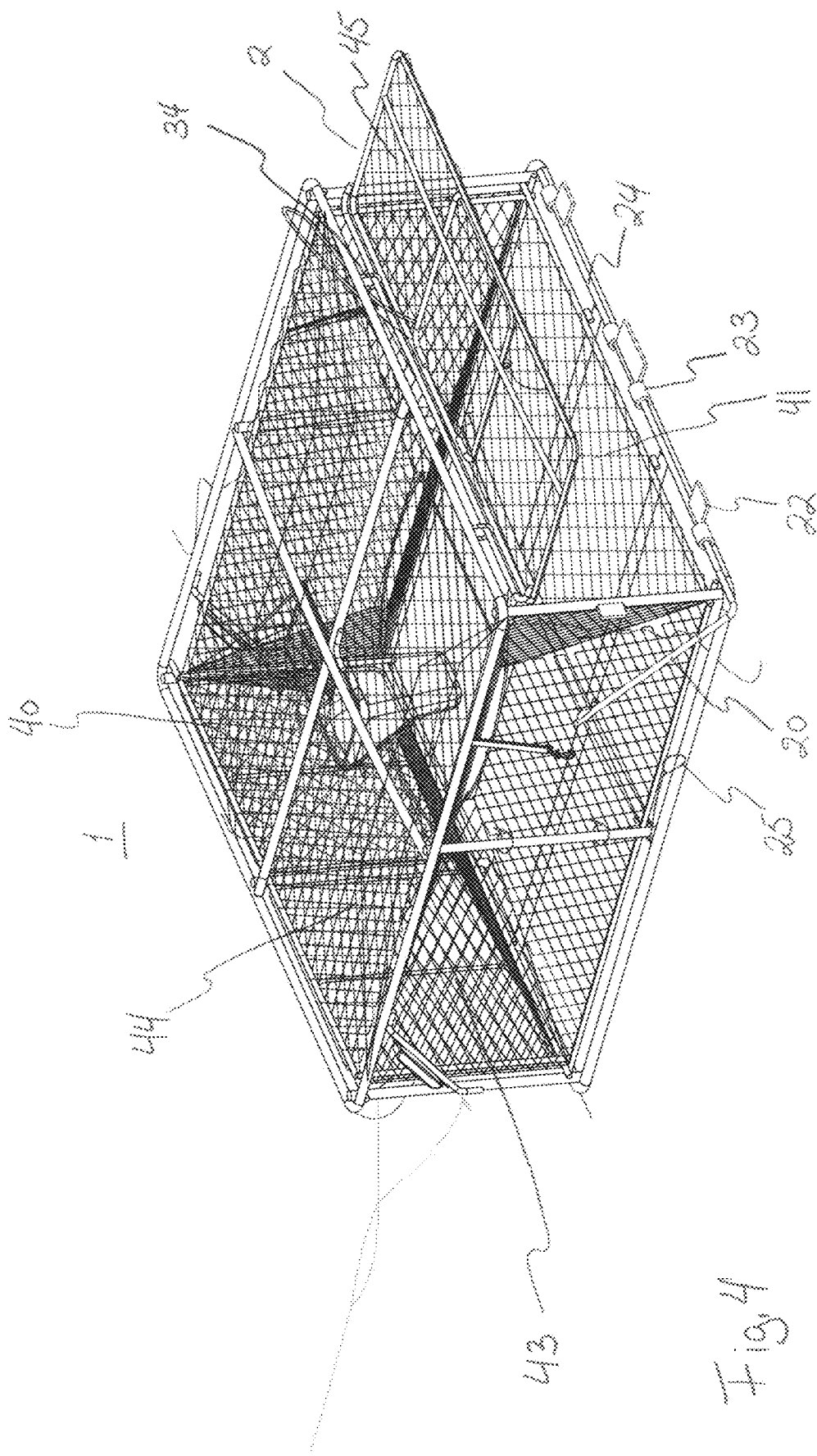

KING CRAB OR FISH POT

The invention relates to pots for large crabs, such as king crabs, or large fish, in particular cod. In particular, the invention concerns a door solution for such pots.

BACKGROUND

Pots or traps for fish such as cod, or large crabs such as king crabs, are often large rectangular rigid frame structures. These pot structures typically have dimensions of about 2.1 m×2.4 m×0.86 m (about 7.0'×8.0'×34") and have a weight of about 400 kg (about 880 lb). The outer frame structure is normally made of carbon steel which enables the pot to be heavy enough to sink to the bottom of the sea floor for fishing, as well as providing a strong enough structure to be able to hold the crabs and cod. When the pot is recovered from the sea floor after fishing and is filled with crabs or cod, the pot may weigh up to 500-1.000 kg (about 1100-2200 lb). Fishing for cod or large crabs such as king crabs take place in arctic environments as e.g. in Alaska, the Bering sea, the Barents Sea and northern part of Norway. The weather conditions may be hard and difficult with snow, icing conditions on the fishing vessel, strong winds and tough waves. The working conditions for the crew on deck may be very difficult and dangerous. The deck crew wear protective and warm garments including thick and warm glows. The pots are heavy to handle when they come on board after recovery from the sea floor. In order to be able to remove the crabs or fish from the pot after recovery of the pot, the pot is provided with a door on the side of the pot. The door is secured by using a rope and manually tying the rope to secure the door and untying the rope when the door is to be opened for emptying the pot for crabs or fish. A door secured with a rope is difficult and sometimes impossible to manually handle both when closing the door before launching the pot overboard and when opening the door for removal of crabs or fish after recovery from the sea floor.

SUMMARY OF THE INVENTION

The invention provides a pot for catching fish such as cod or halibut, or large crabs such as e.g. king crabs or tanner crabs. The pot is provided with an improved door solution. A lockable door is adapted for unloading crabs or fish from the pot. A locking mechanism is operable for locking and unlocking the door.

The pot comprises a frame structure defining a shape of the pot. A number of mesh panels are attached to the frame structure. The pot is provided with at least one entrance for crabs or fish to enter the pot.

The locking mechanism may be in the form of a handle bar with a longitudinal part extending along a bottom part of the frame structure. The longitudinal part may be provided with blocking elements blocking the door from being outwardly opened when the handle bar is in the locking position. The blocking elements may have a shape adapted to block the door when the blocking devices are in an upward position extending upward from the longitudinal part. The shape may be a plate like shape. The locking mechanism may be fixed to the frame structure by bushings arranged around the longitudinal part, whereby the longitudinal part of the locking mechanism is rotatable within the bushings for locking and unlocking the door. The handle bar may be secured in the locked position by use of at least one (looped) rope. The frame structure may be a steel bar structure. The door may be hinged to the frame structure by use of at least one (looped) rope. The pot may particularly be used for trapping king crabs or large fish such as cod or halibut.

The pot with the improved door solution simplifies the handling of and the work with the pot. The locking mechanism with a handle is easy to operate also with protective gloves. When the pots come over the side of the ship, the door is easily opened, and the crabs or fish unloaded through the large door by simply pouring the crabs or fish out of the pot. The pots are heavy when recovered from the sea and often have a weight of 500-1.000 kg when they are full of crabs or fish. Easy operation of the locking mechanism for the door and the door itself and fast unloading of the pot is thus important both to reduce time for unloading the pot, but also for security reasons. A full and heavy pot coming over the side of the ship and swinging over deck represent a danger for the crew working on deck.

The improved locking mechanism for the door increases the efficiency when preparing the pots for launch into the sea. The change of position of the locking mechanism between the open and closed position is also a visual indication of when the door is closed and when the door is open. This reduces the possibility of deploying a pot with a not securely closed door. A pot with a not securely closed and locked door may also lose crabs or fish when hauling the pot to the surface resulting in an economic loss or at least more time spent on the sea in order to catch enough crab or fish to fulfill the quota for the fishing vessel.

BRIEF DESCRIPTION OF DRAWINGS

Example embodiments of the invention are described with reference to the following drawings, where:

FIG. 3 shows the crab or fish pot from FIG. 2, with the door in a locked position.

FIG. 4 is a schematic view of an example cod pot with a front door in an opened position for removal of cod after recovery from the sea or for loading the pot with bait before deploying the pot into the sea.

DETAILED DESCRIPTION

Figure 1:
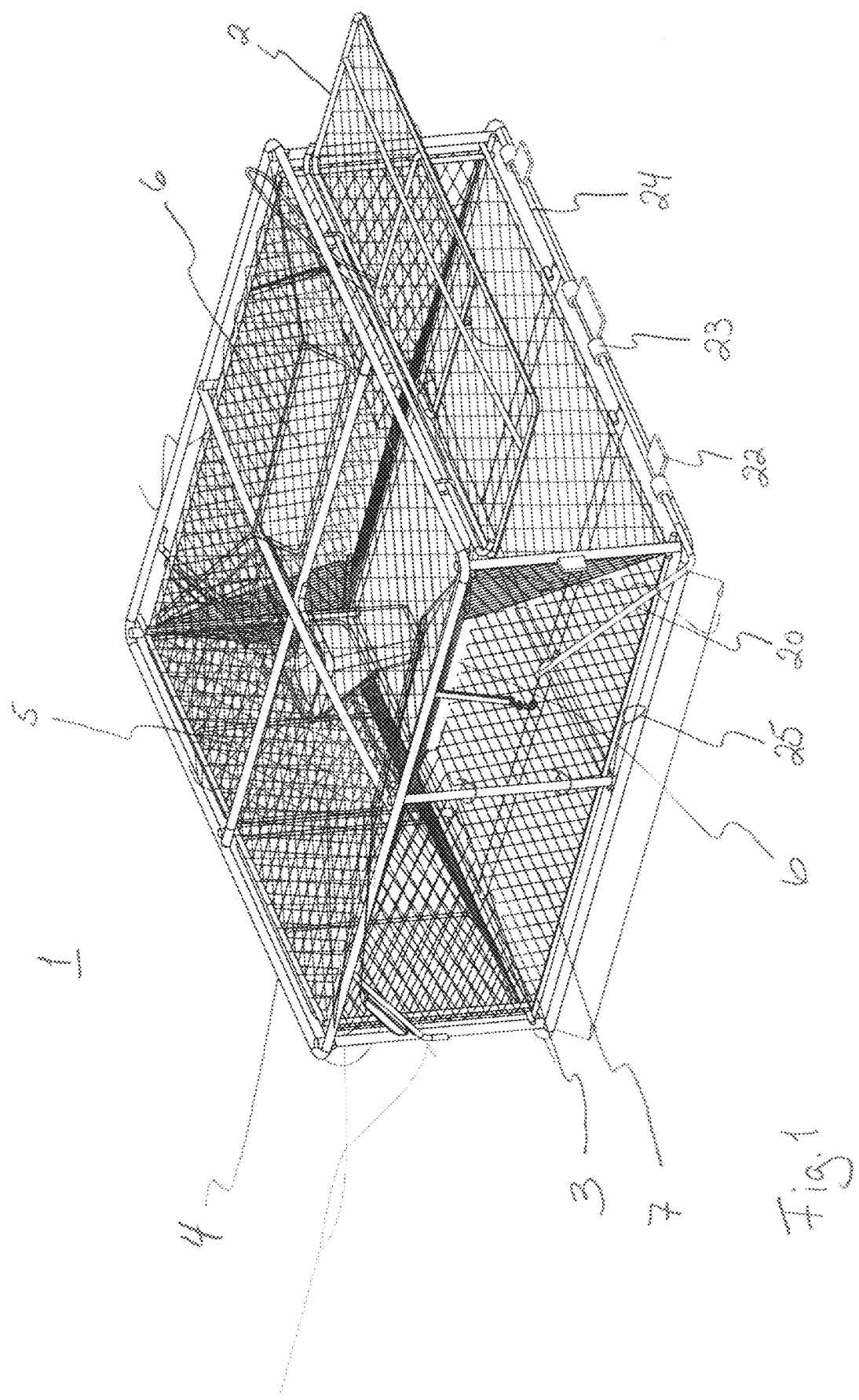
FIG. 1 is a schematic view of an example crab or fish pot with a front door in an opened position for removal of crabs or fish after recovery from the sea or for loading the pot with bait before deploying the pot into the sea.

Example embodiments are described with reference to the drawings. The same reference numerals are used for the same or similar features in all the drawings and throughout the description.

In FIG. 1 shows a crab pot 1 with a door 2 on one of the long sides of the crab pot.

Figure 2:
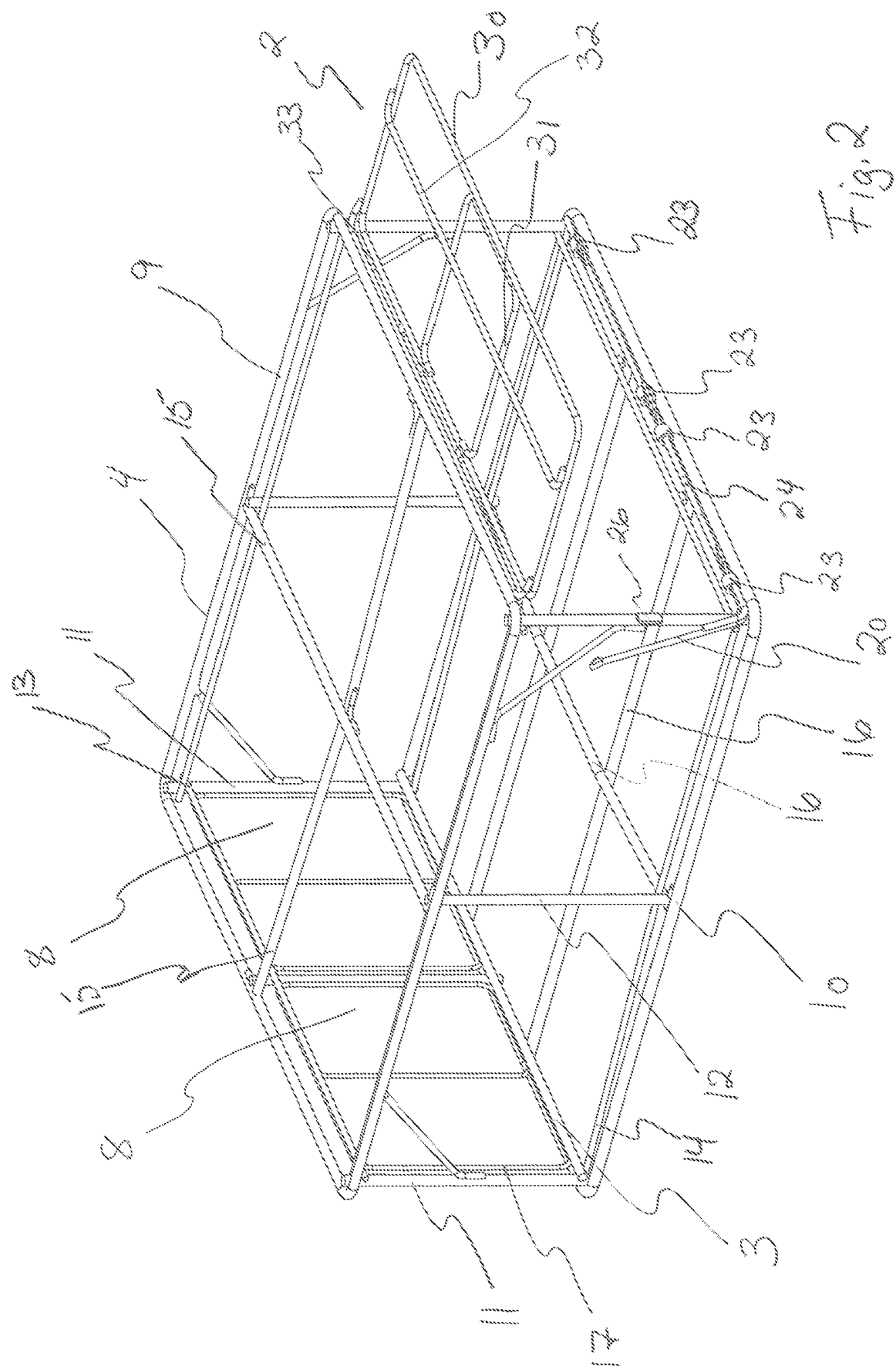
FIG. 2 is a schematic view of an example crab or fish pot with netting removed showing only a frame bar structure of the pot with the front door in the open position.

The crab pot is provided with mesh panels/webbing/netting. In FIG. 1, the door 2 is in an open position for unloading crabs from the crab pot. The door is also used for loading the crab pot with bait, -jars and -bags before launch of the crab pot into the sea. As shown in FIGS. 2 and 3, where the mesh panels 5 have been removed from the crab pot, the crab pot has a bar structure forming a frame defining the shape of the crab pot. The frame also serves as a skeleton for attaching the webbing/mesh panels 5 to the crab pot. The crab pot 1 is constructed of an outer frame 4 and an inner frame 3. The outer frame 4 is rigid and provides structural strength. The outer frame also provides additional weight enabling the crab pot to sink through the water to the sea floor. The inner frame 3 is also rigid and provides a skeleton on to which various webbing parts/mesh panels 5 may be attached forming the crab pot closure for the crabs. The mesh panels provide the enclosed structure preventing the crabs from escaping the crab pot. Preferably the webbing/mesh parts are tied to the inner frame 3. The crab pot in FIG. 1 also has two entrances 6 for crabs to enter the crab pot. The entrances 6 are provided with ramps 7 enabling the crabs to crawl into the crab pot. The entrances have a construction making it easy for the crabs to enter the crab pot, but difficult to get out again ("one-way doors").

FIG. 4 shows a cod pot 1 with a door 2 on one of the long sides of the cod pot. The cod pot is provided with mesh panels/webbing. The main construction of the cod pot is similar to the construction of the cod pot; i.e. with an inner frame 3 and an outer frame 4 and the door 2 as shown in FIGS. 2 and 3. The cod pot in FIG. 4 is however provided with three entrances for the cod to swim into the pot. The description below of the inner and outer frame also apply for the cod pot.

The outer frame 4 has a rectangular shape in the embodiment shown in FIGS. 1-4, but the shape of the crab pot may also take other forms, e.g. in the form of a square. The size and shape depend on the vessel capabilities, fishermen preferences and species of crabs or fish to be caught. A typical size for a king crab pot and a cod pot may e.g. be 7.0'×8.0'×34" (W×L×H).

As shown in FIGS. 2 and 3, the outer frame 4 is constructed of an outer top frame 9 and an outer bottom frame 10. The outer bottom frame 10 is adapted to rest on the sea floor when the crab pot is deployed into the sea. The outer top frame 9 and outer bottom frame 10 are arranged oppositely facing each other and define the shape and width and length of the crab pot. Four support frame bars 11 are provided as corner posts for the outer top frame 9 and outer bottom frame 10 connecting the outer top frame and outer bottom frame together. Three additional support frame bars 12 are provided between the outer top frame 9 and the outer bottom frame 10 further connecting the outer top frame and outer bottom frame together and providing increased stiffening and stability of the crab pot. In the embodiment in FIGS. 2 and 3, these three additional support frame bars 12 are arranged with one additional support frame bar arranged on each short side and one additional support frame bar on the long side oppositely facing the long side provided with the door. Two upper frame bars 15 are provided in a cross configuration on the outer top frame 9 for stiffening the top frame structure. Three bottom frame bars 16 are also provided in a cross configuration on the outer bottom frame 10 for stiffening and strengthening the outer bottom frame structure. The outer frame may also be provided with at least one escape door 8 oppositely facing the door 2.

The inner frame 3 is constructed of an inner top frame 13 and an inner bottom frame 14 that are connected by a number of inner support bars 17 forming a cage like structure as shown in FIG. 1. A number of bracing bars 18 are provided on the inner frame as reinforcement parts. The embodiment shown in FIGS. 1-4 has four inner support bars 17 and 18 inner frame bracing bars 18 (only a few of the inner frame bracing bar elements are provided with reference number in FIGS. 2 and 3). The number of support bars and bracing bars may vary depending upon the required strength and size of the pot. The inner frame is arranged inside the outer frame. The inner frame 3 and the outer frame 4 are preferably welded together, but other techniques for reliably attaching the inner frame to the outer frame may also be used.

The lockable door 2 for unloading the crab and loading the pot with bait-jars and -bags is the main door of the crab pot. The main door of the crab pot is provided by an outer door frame 30 defining the size and shape of the door 2. The door 2 is shown in all the FIGS. 1-4 but explained with reference to FIGS. 2 and 3 showing the pot without mesh panels. The outer door frame 30 is reinforced by a reinforcement bar part 31 typically located in the middle part of the outer door frame 30. The door 2 is also reinforced with a mainly longitudinal bar part 32, which in FIGS. 2 and 3 are located in the lower half of the door 2. The door 2 is hinged 34 to the outer frame 4. The hinges may be made of rope, but other materials may also be used. The ropes may be looped and connect an upper bar of the door with a longitudinal upper bar of the outer frame. The rope hinges 34 enable the door 2 to be opened and turned so as to lay flat against the outer top frame 9 of the crab pot (turned about 270°). The door 2 is then kept out of the way both when removing the crabs from the crab pot and when loading the crab pot with bait. This facilitates the handling of the crab pot for the crew on deck of the fishing vessel.

The crab pot 1 is also provided with escape doors (small doors) (clad) with netting. The size of this netting varies for different species of crab as regulated by government. The escape doors 8 enable small crabs to escape the crab pot. The escape doors 8 are preferably also hinged to the crab pot outer structure by the use of ropes. There are restrictions from fishing too small crabs and these too small crabs may therefore crawl out of the crab pot through the escape doors. Small crabs in the crab pot will also take up space and add unnecessary weight upon retrieval of the crab pot from the sea floor. There is also a risk the smaller crabs may be harmed by the larger crabs and it is desirable to let the small crabs out of the crab pot again alive and without injuries in order to preserve the crab stock for future fishing. It is also not desirable to catch smaller crab species, but rather fill the crab pot with large crabs, such as king crabs.

The cod pot is however not provided with escape doors. In case the cod pot should be lost in the sea, the cod pot has a mechanism preventing the cod pot from "ghost fishing". This mechanism avoids the pot from continuing to trap cod inside the pot. To avoid "ghost fishing", a part of the cod pot mesh panels are sewn together by use of a cotton thread. The cotton thread will dissolve after the cod pot has been a certain time into the sea resulting in an emergency escape opening in these mesh panels so the fish may swim out of the pot.

The door 2 is provided with a locking mechanism to keep the door securely locked when the pot is fishing in the sea and during retrieval of the pot from the sea. A pot may have a weight of about 500-1.000 kilos when the pot is full of crabs on retrieval from the sea. The locking mechanism needs to withstand the weight from the crabs or fish on the door also during retrieval and when the pot makes its way up from the sea surface and onto the ship deck. The locking mechanism has a shaft or handle 20 that is operable between a position where the door is closed (FIG. 3) and an open position (FIG. 2) where the door is no longer locked and may be opened. The locking mechanism is in FIGS. 1-4 a handle bar 20, where a longitudinal part 24 of the handle bar runs parallel with the lower part of the door. The transition between the handle bar 20 and the longitudinal part is reinforced by a bracing bar 21. The longitudinal part 24 is provided with a number of blocking elements 22 that secure the door when the locking mechanism is in the locked position. In the locked position as shown in FIG. 3, the blocking elements 22 are arranged in an upwards direction in front of the door blocking the door from being opened. The blocking elements 22 may be in the form of plates as shown in FIG. 3, but other structures and shapes may also be used. A number of bushings 23 are arranged on the longitudinal part 24 of the handle bar 20 attaching the longitudinal part of the handle bar to the outer bottom frame 10 of the crab pot.

Four bushings 23 and three blocking elements are shown in FIG. 2, but the number may vary depending upon the size and shape of the pot. The longitudinal part of the handle bar rotates inside the bushings 23 when the handle bar 20 is operated between the open and closed position. The bushings 23 are arranged on the outside of the blocking elements 22 and fasten the longitudinal part of the handle bar 20 to the outer lower frame. The shaft or handle of the handle bar in FIGS. 1-4 extends on the outside of the crab pot outer frame 4 and is easily manually operated by hand and also by hand with thick gloves for arctic use and in rough weather.

The pot is provided with a rope for hauling the pot up from the sea floor. After recovery of the pot to the ship deck, the shaft or handle 20 is operated to set the locking mechanism in an open position. When the pot is tilted forward, the door is opened due to gravity by the door's own weight and by the weight of the crabs or fish in the pot, and the crabs or fish are effectively unloaded/poured out of the pot through the door opening. Before deployment of the pot into the sea again, the pot is loaded with bait jars and bait bags inside the pot through the door. After loading the pot with bait, the door is manually closed and the shaft or handle 20 operated to lock the door in the closed position. The shaft/handle is secured in the locked position by use of a locking rope with rubber 25. The rubber is connected to the bottom frame and extends into the locking rope and secures the handle of shaft 20 in the locked position (almost) parallel with the bottom frame bar as shown in FIG. 3. The locking rope may be flexible or combined with a flexible member for improved locking of the shaft or handle down towards the bottom frame structure. The locking rope may be provided as a loop connected to the outer frame 4. A stopper 26 extending from the corner post prevents the shaft/handle 20 from extending beyond the pot vertical corner posts when the shaft or handle and the door is in the open position as shown in FIGS. 1, 2 and 4.

As explained above, the inner frame serves as a structure for attaching the various mesh panels to the crab pot. The mesh panels form the cage structure traps the crabs inside the crab pot. The mesh panels are tied onto the inner frame of the crab pot, as well as tied to the door and escape doors. The main mesh panels in the crab pot in FIGS. 1 and 4 are a top net 40, a bottom net 41, entrance nets 42 on the opposite short sides forming two funnels for the crabs to enter the crab pot, a door net 45 on the lockable door and a back net 43. The crab pot is also provided with emergency escape nets 44 for small crabs to escape the crab pot. In FIG. 1, the emergency escape nets are provided next to the back net on the small doors 8. As explained above, a fish pot would not have emergency escape doors, but instead a mechanism to prevent "ghost fishing". A fish pot would instead of the funnels be provided with entrances for fish (e.g. cod or halibut). The nets are fixed to the pot bar structure by the use of ropes. The pot structure may also be provided with rubber pipes to prevent abrasion on the netting from the surroundings when the crab pot is in use on the sea floor.

The inner frame 3 and the outer frame 4 of the pot, as well as the door 2 and escape doors 8 are preferably made of steel bars, preferably heavy steel or carbon steel, but other heavy and durable materials for sea water use may be also be used. The steel bars are welded together forming the structure as detailed above. Other connecting techniques may also be envisaged. The crab pot, preferably the inner frame, is provided with pieces of zinc for catalytic protection of the crab pot.

The crab pot is in particular adapted for large crabs such as king crabs, including e.g. Red King Crab (*Paralithodes camtschaticus*), Blue King Crab (*Paralithodes platypus*). Golden King Crab (*Lithodes aequispinus*), but also Tanner Crabs (such as *Chionoecetes bairdi* and *C. opilio*). The fish pot is in particular adapted for large fish such as cod or halibut.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A pot for catching crabs or fish, the pot comprising:
   a frame structure comprising a top frame and a bottom frame connected to each other by one or more support bars, wherein the bottom frame is adapted to rest at the sea floor;
   at least one entrance for crabs or fish to enter the pot;
   a lockable door arranged on a longitudinal side of the frame structure and adapted for unloading crabs or fish from the pot; and
   a locking mechanism operable for locking and unlocking the lockable door,
   wherein the locking mechanism comprises a handle bar movable between a locking position and an unlocking position, the handle bar having a longitudinal part extending along the longitudinal side of the frame structure, the longitudinal part being provided with blocking elements,
   wherein the longitudinal part of the handle bar is rotatable by the handle bar so as to move the blocking elements into a blocking position in which the blocking elements extend upward from the longitudinal part of the handle bar to block the lockable door from being outwardly opened when the handle bar is in the locking position, and so as to move the blocking elements into an open position allowing the lockable door to open when the handle bar is in the unlocking position, and
   wherein each of the blocking elements is in the form of a plate.

2. A pot for catching crabs or fish, the pot comprising:
   a frame structure comprising a top frame and a bottom frame connected to each other by one or more support bars, wherein the bottom frame is adapted to rest at the sea floor;
   at least one entrance for crabs or fish to enter the frame structure;
   a lockable door arranged on a longitudinal side of the frame structure and adapted for unloading crabs or fish from the pot; and
   a locking mechanism operable for locking and unlocking the lockable door,
   wherein the locking mechanism comprises a handle bar, the handle bar having a first portion movable between a locking position and an unlocking position, the first portion extending along a lateral side of the frame structure, and a second portion which comprises a longitudinal part that extends along the longitudinal side of the frame structure, the longitudinal part being provided with blocking elements, and wherein the longitudinal part is rotatable by movement of the first portion of the handle bar so as to move the blocking elements into a blocking position in which the blocking elements extend upward from the longitudinal part of the handle bar to block the lockable door from being outwardly opened when the first portion of the handle bar is in the locking position, and so as to move the blocking elements into an open position allowing the lockable door to open when the first portion of the handle bar is in the unlocking position.

3. The pot according to claim 2, where the longitudinal part of the handle bar is fixed to the frame structure by bushings arranged around the longitudinal part of the handle bar, whereby the longitudinal part of the handle bar is rotatable within the bushings for locking and unlocking the door.

4. The pot according to claim 2, where the first portion of the handle bar is secured in the locking position by use of at least one rope.

5. The pot according to claim 4, wherein the rope is a looped rope.

6. The pot according to claim 2, further comprising one or more mesh panels attached to the frame structure.

7. The pot according to claim 2, wherein the frame structure is a steel bar structure.

8. The pot according to claim 2, where the lockable door is hinged to the frame structure by use of at least one rope.

9. The pot according to claim 8, wherein the rope is a looped rope.

10. The pot according to claim 2, wherein the pot is used for trapping king crabs or cod or halibut.

11. The pot according to claim 2, wherein the frame structure is a carbon steel structure.

\* \* \* \* \*